Dec. 27, 1927.

Re. 16,828

L. H. BERGMAN

PULVERIZED FUEL FURNACE

Original Filed Jan. 7, 1920

2 Sheets-Sheet 1

Inventor

Lars Hugo Bergman

Barnett & Truman

Attorneys

Dec. 27, 1927.

Re. 16,828

L. H. BERGMAN

PULVERIZED FUEL FURNACE

Original Filed Jan. 7, 1920

2 Sheets-Sheet 2

Inventor

Lars Hugo Bergman

By Barnett & Truman

Attorneys

Reissued Dec. 27, 1927

Re. 16,828

UNITED STATES PATENT OFFICE.

LARS HUGO BERGMAN, OF CHICAGO, ILLINOIS, ASSIGNOR, BY MESNE ASSIGNMENTS, TO RAYMOND BROS. ENGINEERING CO., OF CHICAGO, ILLINOIS, A CORPORATION OF ILLINOIS.

PULVERIZED-FUEL FURNACE.

Original No. 1,421,898, dated July 4, 1922, Serial No. 350,015, filed January 7, 1920. Application for reissue filed December 24, 1923. Serial No. 682,536.

This invention relates to pulverized fuel furnaces, more particularly those in which separate streams of air are introduced therein, one to propel the fuel into the furnace, and the other to supply the necessary additional oxygen for complete combustion.

Powdered fuel, even when crushed so that 80% will pass 100 mesh, takes an appreciable time to burn so that provision must be made to allow sufficient time for complete combustion.

Not only is it necessary to allow time for combustion, but it is also desirable to provide means for intimately mixing the powdered fuel with the air in which it is burnt.

One of the objects, therefore, of the present invention is to provide a method of and means whereby the powdered fuel and air are caused to travel over a path of sufficient length under conditions which bring about complete combustion of the fuel and the precipitation of incombustibles as ash.

Another object of the invention is to provide means for intimately mixing the powdered fuel with the air in which it is burnt.

A further object of the invention is to provide improved means for collecting the ash produced by the burning of the fuel.

Other and further important objects of the invention will be apparent from the disclosures in the drawings and specification.

The invention (in a preferred form) is illustrated in the drawings and hereinafter more fully described.

Figure 1:
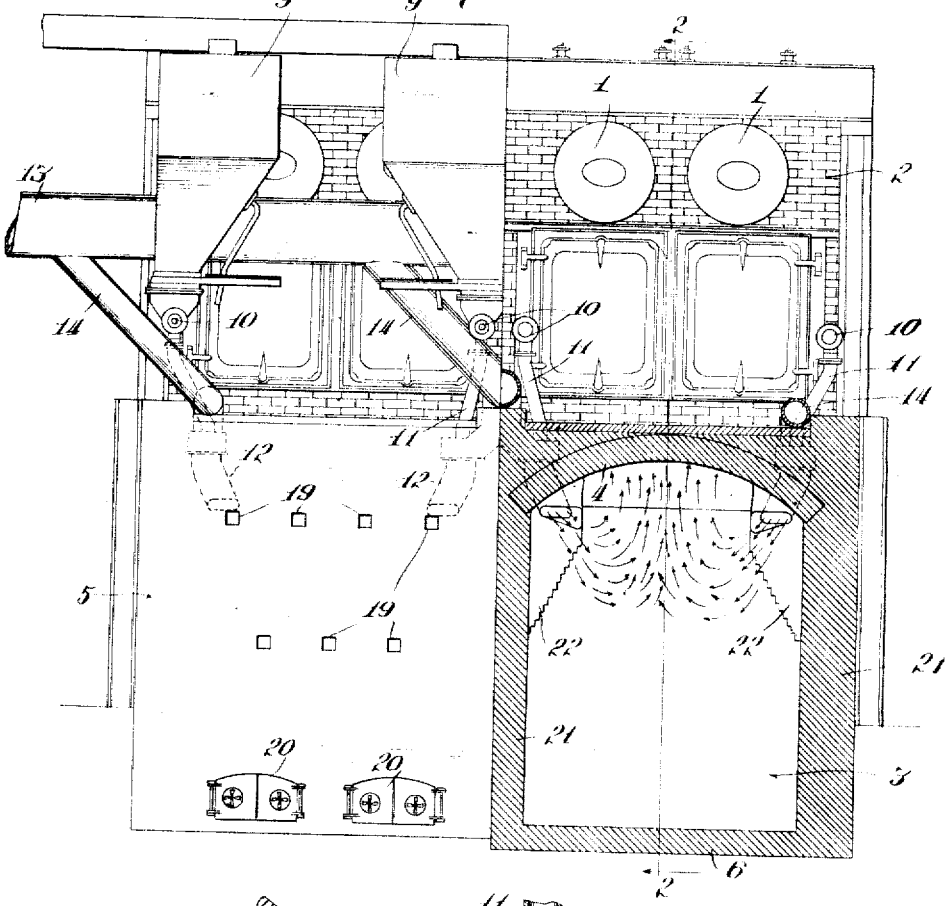
Figure 1 is a front elevation of a furnace and boiler constructed in accordance with the present invention, one-half of the figure being in section on the line 1—1 of Fig. 2.

The furnaces shown form the fire-boxes of a series of water-tube boilers, each denoted by the reference numeral 1, mounted in brickwork 2 in the usual way. The furnace itself consists of a fire-brick chamber 3 having an arched roof 4, a front wall 5, and a bottom 6, the rearward part 7 of which slopes upwardly towards the water tubes 8 of the boilers. Powdered fuel, usually coal dust, is stored in a series of hoppers 9 arranged along the front of the boilers. The lower parts of these hoppers communicate with worm feeding devices 10 adapted to supply powdered fuel at a uniform rate to vertical pipes 11 which carry the fuel to fuel nozzles 12. The necessary air for injection of the powdered fuel and for the combustion thereof is supplied from a blower or fan (not shown) through a conduit 13 from which lead branch connections 14 to the respective fuel nozzles.

Figure 4:
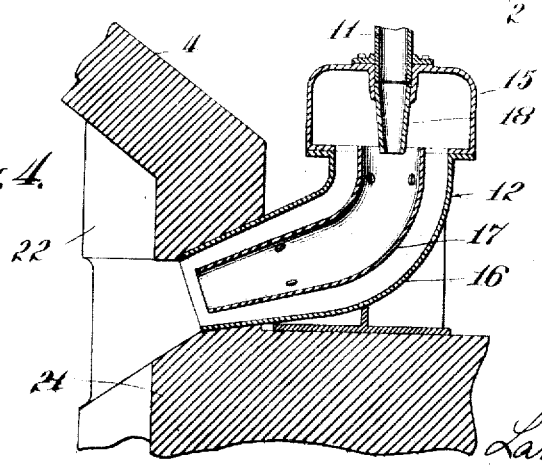
Fig. 4 is a vertical section through one of the pulverized fuel injectors.
Figure 2:
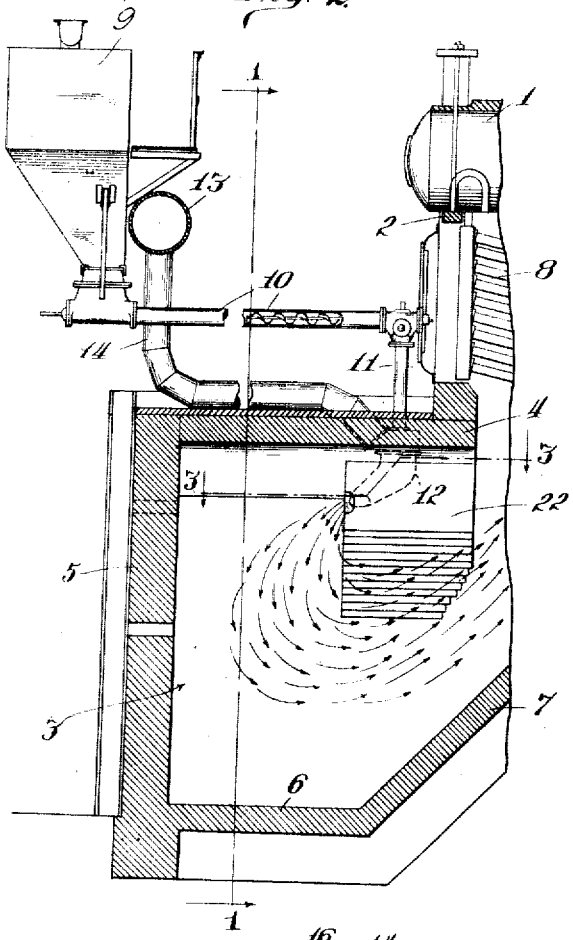
Fig. 2 is a section on the line 2—2 of Fig. 1.
Figure 3:
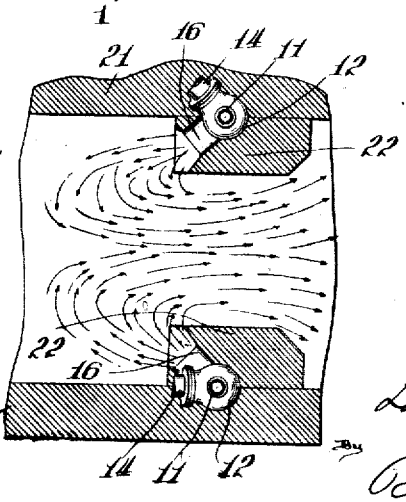
Fig. 3 is a section on the line 3—3 of Fig. 2, the nozzles being shown in elevation.

The construction of each nozzle is shown more particularly in Fig. 4 in which it is seen that the nozzle comprises a chamber 15 at its upper end to which air is supplied through one of the pipes 14. From the lower end of this chamber extend curved concentrically arranged pipes 16 and 17. Centrally arranged in the top of the chamber 15 is the end of the pipe 11 to which is connected by suitable means a conical jet 18, by which powdered fuel is directed into the inner of the two concentric pipes. The air flowing from the chamber 15 downwardly through the pipes 16 and 17 is divided into two concentric streams, the outer one being of air only while the inner one consists of air carrying with it particles of coal dust. It will be seen that slow moving currents of air will be sufficient to carry the fuel into the furnace, on account of the peculiar construction and disposition of the burners.

These nozzles are arranged in the side walls 21 of the chamber 3 adjacent to its upper edge so as to direct streams of air inwardly, downwardly and forwardly as indicated by the arrows in the various figures. By "forwardly" I mean toward the front wall of the furnace, that is the wall opposite to the draft outlet; and by inwardly I intend away from a side, that is one of the walls transverse to said front wall. Adjacent each nozzle the side wall is thickened, as at 22, so that the entire nozzle is surrounded by fire brick and thereby protected against the extreme heat of the furnace. Pairs of nozzles are employed to produce converging and mutually impinging streams of air with the result that each of the streams is thoroughly broken up, thereby intimately mixing the air introduced merely for the purpose of completing combustion with the streams of air which act to propel the pulverized coal into the furnace. In this way a very satisfactory intermixture of the fuel and the air is obtained. Further, by directing the streams of air downwardly and forwardly and thereafter rearwardly and upwardly to the discharge flue or draft opening the particles of fuel are retained in the chamber 3 sufficiently long either to burn completely therein or to burn to such an extent that combustion is completed as the gases pass through the tubes 8 of the boilers and any heavy particles from the nozzles gravitate into the lower or rearwardly moving portion of the return bent stream to enhance the chances of combustion being complete. One other result of causing the gases to flow around this circuitous or return bent path is to aid in the separation of the ash which is thrown against and collects upon the inclined bottom 7 of the chamber. The ashes may be removed from time to time through doors 20 arranged along the lower edge of the front wall 5. Sight holes 19 may also be provided in this front wall so that the operation of the furnace may be observed.

From the foregoing it will be observed that the body of fuel mixed with air is introduced into the combustion zone in such manner that under the combined forces of the entering stream or streams, gravity and the draft, the fuel in combustion takes a curved or circuitous course, first passing laterally and downwardly away from the outlet, then bending back horizontally beneath the incoming streams, and then curving upwardly and rearwardly towards the outlet to the boiler. During this entire course it is not guided by the chamber walls but follows a course determined by the balanced forces of the initial velocity, gravity, and the draft so that there is no forceful contact with the furnace walls and bottom, and the stream of combustible fuel is enveloped by a body of air which when introduced into the furnace is substantially free from fuel and which, following the course of the fuel stream, supplies additional oxygen thereto, tends to protect the walls and bottom of the furnace, tends to insure against direct impingement of the fuel stream thereagainst, and acts to cool the incombustibles naturally in a molten state, so that the deposit of such incombustibles is in the form of ash which can be readily removed. A pocket of some depth is, in effect, provided at the bottom of the furnace below the course of the fuel stream through which the slag particles may fall and congeal and in which they are collected.

Preferably, as shown in the drawings, the fuel particles and flames pass through the combustion chamber in two streams which remain separate until after they have reverted whereupon they move in juxtaposed relation below the incoming fuel streams and eventually merge in their movement to the draft outlet whereby the incoming fuel is subjected to the heat of the juxtaposed and merged flame streams in a manner calculated to give most complete combustion of the fuel as well as the combustion of the maximum quantity of fuel for a combustion chamber of given size.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a furnace for pulverized fuel, a combustion chamber, downwardly directed fuel conduits, air chambers one surrounding the mouth of each fuel conduit, mixture conduits leading from each of said air chambers into the combustion chamber, said mixture conduits being curved so as to deliver streams inclined downwardly and toward the front of the combustion chamber, said inclined streams converging toward the front of the combustion chamber, an outlet at the rear of said combustion chamber, means for conveying pulverized fuel to said fuel conduits, and means for conveying air under pressure to said air chambers.

2. In a furnace for pulverized fuel, a combustion chamber, downwardly directed fuel conduits, air chambers one surrounding the mouth of each fuel conduit, mixture conduits leading from each of said air chambers into the combustion chamber, said mixture conduits being curved so as to deliver streams inclined downward and toward the front of the combustion chamber, said inclined streams converging toward the front of the combustion chamber, air conduits surrounding said mixture conduits respectively, whereby the streams delivered each consist, at the point of delivery, of a central stream of mixture of air and fuel and an annular surrounding stream of air relatively free from fuel, an outlet at the rear of said combustion chamber, means for conveying pulverized fuel to said fuel conduits, and means for conveying air under pressure to said air chambers.

3. In a furnace for burning pulverized fuel, having an arch, a wall at one end of the arch, a draft opening at the other end, and a boiler arranged to be heated by products of combustion passing through said draft outlet; means for projecting a stream of fuel under the arch in the direction toward said wall, so that under the combined action of the force of the incoming stream, gravity and the draft, the fuel in combustion takes a return bent course, first away from and then toward the draft, without impingement upon the arch, wall or bottom of the furnace, with the returning stream below the incoming stream.

4. In a furnace for burning pulverized fuel having an arch, a wall at one end of the arch, a draft opening at the other end, and a boiler arranged to be heated by products of combustion passing through said draft outlet; means for projecting a stream of fuel into the furnace in a diagonal direction downwardly and away from the arch and toward said wall, so that under the combined action of the force of the incoming stream, gravity and the draft, the fuel in combustion takes a return bent course, first away from and then toward the draft without impingement upon the arch, wall or bottom of the furnace, with the returning stream below the incoming stream.

5. In a furnace for burning pulverized fuel having an arch, a wall at one end of the arch, a draft opening at the other end, and a boiler arranged to be heated by products of combustion passing through said draft outlet; means for projecting converging streams of fuel under the arch in the direction toward said wall so that under the combined action of the force of the incoming stream, gravity and the draft, the fuel in combustion takes return bent courses, first away from and then toward the draft, without impingement upon the arch, wall, or bottom of the furnace, with the returning stream below the incoming streams.

6. In a furnace for burning pulverized fuel having an arch, a wall at one end of the arch, a draft opening at the other end, and a boiler arranged to be heated by products of combustion passing through said draft outlet; means for projecting converging streams of fuel into the furnace in diagonal directions downwardly away from the arch and toward said wall, so that under the combined action of the force of the incoming streams, gravity and the draft, the fuel in combustion takes return bent courses, first away from and then toward the draft, without impingement upon the arch, wall or bottom of the furnace, with the returning stream below the incoming streams.

7. In a furnace for burning pulverized fuel, having an arch, a wall at one end of the arch, a draft opening at the other end, and a boiler arranged to be heated by products of combustion passing through said draft outlet; means for projecting a stream of fuel under the arch in the direction toward said wall, so that under the combined action of the force of the incoming stream, gravity and the draft, the fuel in combustion takes a return bent course, first away from and then toward the draft, without impingement upon the arch, wall or bottom of the furnace, with the returning stream below the incoming stream, and means for introducing into the furnace a body of air, substantially free from fuel, which envelops and follows the fuel stream in its course through the furnace.

8. In a furnace for burning pulverized fuel having an arch, a wall at one end of the arch, a draft opening at the other end, and a boiler arranged to be heated by products of combustion passing through said draft outlet; means for projecting converging streams of fuel under the arch in the direction toward said wall so that under the combined action of the force of the incoming streams, gravity and the draft, the fuel in combustion takes return bent courses, first away from and then toward the draft, without impingement upon the arch, wall, or bottom of the furnace, with the returning stream below the incoming streams, and means for introducing into the furnace bodies of air substantially free from fuel, which envelop and follow the fuel streams in their courses through the furnace.

9. In a furnace for burning pulverized fuel having an arch, a wall at one end of the arch, a draft opening at the other end, and a boiler arranged to be heated by products of combustion passing through said draft outlet; means for projecting a stream of fuel and an enveloping stream of air substantially free from fuel, into the furnace in a direction downwardly away from the arch and toward said wall, so that under the combined action of the force of the incoming stream, gravity and the draft, the fuel in combustion takes a return bent course first away from and then toward the draft, without impingement upon the arch, wall, or bottom of the furnace, with the returning stream below the incoming stream.

10. In a furnace for burning pulverized fuel having an arch, a wall at one end of the arch, a draft opening at the other end, and a boiler arranged to be heated by products of combustion passing through said draft outlet; means for projecting converging streams of fuel, together with streams of air enveloping said fuel streams respectively, into the furnace, in diagonal directions downwardly away from the arch and toward said wall so that under the combined action of the course of the incoming streams, gravity, and the draft, the fuel in combustion takes return bent courses first away from and then toward the draft, without impinging upon the arch, wall or bottom of the furnace, with the returning stream below the incoming streams.

11. Method of burning pulverized fuel which consists in projecting into a combustion zone having a draft outlet, in a direction away from said draft outlet, a stream of fuel mixed with air at such velocity that the combined forces of the ingoing stream, gravity and the draft, produce a movement of the burning fuel in a curved return bent path away from, downwardly and back toward the draft outlet, with the returning stream below the ingoing stream and without impingement against the confining walls of said combustion zone.

12. Method of burning pulverized fuel which consists in projecting into a combustion zone having a draft outlet, in a direction away from said draft outlet, a stream of fuel mixed with air at such velocity and angle to the line of the draft that the combined forces of the ingoing stream, gravity and the draft, produce a movement of the burning fuel in a curved return bent path away from, downwardly and back toward the draft outlet, with the returning stream below the ingoing stream and without impingement against the confining walls of said combustion zone, and introducing additional air, substantially free from fuel, into the combustion zone, so that said additional air envelops and follows the course of the fuel stream to provide additional oxygen and a relatively cool atmosphere surrounding the fuel stream into which the incombustibles pass so as to be precipitated as ash.

13. Method of burning pulverized fuel which consists in projecting into a combustion zone having a draft outlet, in a direction away from said draft outlet, converging streams of fuel mixed with air at such velocity and angles to the line of draft that the combined forces of the ingoing streams, gravity and the draft produce a movement of the burning fuel in curved paths away from, downwardly and then back toward the draft outlet, with the returning stream below the ingoing streams without impingement on the confining walls of said combustion zone.

14. Method of burning pulverized fuel which consists in projecting into a combustion zone having a draft outlet, in a direction downwardly and away from said draft outlet, a stream of fuel mixed with air at such velocity that the combined forces of the ingoing stream, gravity and the draft produce a movement of the burning fuel in a curved path away from, downwardly and then backwardly toward the draft outlet with the returning stream below the ingoing stream and without impingement against the confining walls of said combustion zone, and introducing additional air, substantially free from fuel, into the combustion zone so that said additional air envelops and follows the course of the fuel stream to provide additional oxygen and relatively cool atmosphere surrounding the fuel stream into which the incombustibles pass so as to be precipitated as ash.

15. Method of burning pulverized fuel which consists in projecting into a combustion zone having a draft outlet, in a direction away from said outlet, a stream of fuel mixed with air surrounded by an annular stream of air unmixed with fuel at such velocity and angle to the line of draft that the combined forces of the incoming steam, gravity and the draft produce a movement of the burning fuel in a return bent path first away from and then toward the draft outlet with the returning stream below the ingoing stream, and out of contact with the confining walls of the combustion zone.

16. Method of burning pulverized fuel which consists in projecting into a combustion zone having a draft outlet, a plurality of converging streams of fuel mixed with air, in directions away from the draft outlet at such velocity and angles from the line of draft that the combined forces of the ingoing streams, gravity and the draft, produce a movement of the burning fuel in return bent paths, with the returning stream below the ingoing streams, first away from and then toward the draft outlet, and in the center portion of the combustion zone out of contact with the confining walls thereof.

17. Method of burning pulverized fuel which consists in projecting into a combustion zone having a draft outlet a plurality of converging streams of fuel in directions away from the draft outlet and at such velocity and angles from the line of draft that the combined forces of the ingoing streams, gravity and the draft produce a movement of the burning fuel in streams which separately revert in substantially U-shape and then advancing in juxtaposed relation merge and pass to the draft outlet.

18. Method of burning pulverized fuel which consists in projecting into a combustion zone having a draft outlet a plurality of converging streams of fuel, each with an enveloping stream of air, in directions away from the draft outlet and at such velocity and angles from the line of draft that the combined forces of the ingoing streams, gravity and the draft produce a movement of the burning fuel in streams which separately revert in substantially U-shape and then advancing in juxtaposed relation merge and pass to the draft outlet.

LARS HUGO BERGMAN.

CERTIFICATE OF CORRECTION.

Reissue Patent No. 16,828. Granted December 27, 1927, to

LARS HUGO BERGMAN.

It is hereby certified that error appears in the printed specification of the above numbered patent requiring correction as follows: Page 4, line 72, for the word "steam" read "stream"; and that the said Letters Patent should be read with this correction therein that the same may conform to the record of the case in the Patent Office.

Signed and sealed this 31st day of January, A. D. 1928.

M. J. Moore,
Acting Commissioner of Patents.

Seal.